(12) United States Patent
Vachette

(10) Patent No.: US 6,421,143 B1
(45) Date of Patent: Jul. 16, 2002

(54) DIGITAL IMAGE PRINTING PROCESS

(75) Inventor: Thierry Vachette, Esbarres (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/368,439

(22) Filed: Aug. 4, 1999

(30) Foreign Application Priority Data

Aug. 10, 1998 (FR) .......................................... 98 10355

(51) Int. Cl.$^7$ ................................................. G06F 3/12
(52) U.S. Cl. ........................................ 358/1.9; 358/504
(58) Field of Search ........................ 358/1.1, 1.9, 1.11, 358/1.12, 1.13, 1.14, 1.15, 504, 509, 526, 536

(56) References Cited

U.S. PATENT DOCUMENTS

| | | | |
|---|---|---|---|
| 4,526,439 A | * | 7/1985 | Okoshi et al. .............. 359/458 |
| 4,584,604 A | * | 4/1986 | Guichard et al. ............. 348/55 |
| 4,668,063 A | | 5/1987 | Street ......................... 396/330 |
| 5,617,178 A | | 4/1997 | Goggins ....................... 355/22 |

* cited by examiner

Primary Examiner—Mark Wallerson
(74) Attorney, Agent, or Firm—David A. Novais

(57) ABSTRACT

A halftone type printing process for a digital image I intended to be viewed through a lenticular network includes a plurality of lenses. The image I includes a number j of pixel lines and comprises a number n of interleaved images. One interleaved strip of each of the n images is in correspondence with one lens. The process comprises the steps of sampling n images to obtain n digital images comprising a total j of pixel lines; applying a dithering algorithm to each of the n digital images obtained in the preceding step; cutting each dithered image into a number q of strips comprising an identical number of lines for each dithered image, with the cutting being such that the sum of the pixel line strips of the n images intended to correspond with the same lens is equal to j/q; constructing the image I by interleaving the strips of n dithered images in order; and printing the image I.

11 Claims, 4 Drawing Sheets

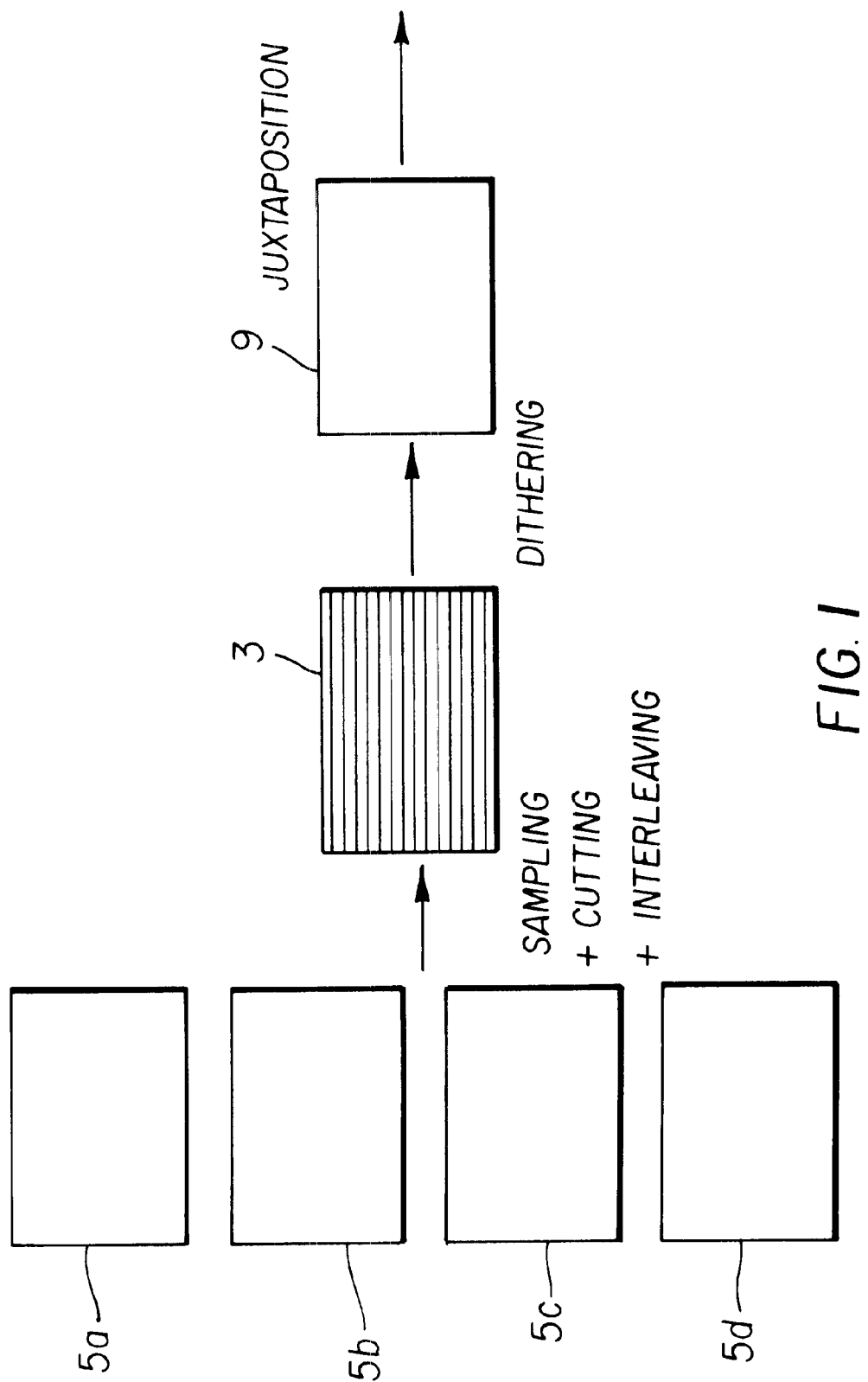

DIGITAL IMAGE PRINTING PROCESS

FIELD OF THE INVENTION

The present invention relates to a digital image printing process, particularly useful for printing autostereoscopic images, especially intended to be viewed through a lenticular network.

BACKGROUND OF THE INVENTION

An image intended to be viewed through a lenticular network is formed from several images that have been cut into strips. FIG. 1 shows the steps of a conventional printing process. As shown in FIG. 1, a starting image is cut into strips 5a–5d of the same width; strips of the same order from each starting image are then arranged contiguously. The image is thus formed of interleaved images 3. A lenticular network is then arranged in front of the image so that all the strips of the images of the same order correspond with the same lens. According to the angle of observation of the image, the observer sees one or the other of the interleaved images. The interleaved images must then be perfectly separated one from each other, i.e., the separation between the different strips must be as sharp as possible so that the observer only sees one image at a time and this must be perfectly clear.

When digital images are printed halftone, a reproduction technique called dithering is sometimes used. This technique simulates the halftones of a black and white image or a color image. Halftones are simulated, either by alternating, according to a selected percentage, the black dots and the white dots for a monochrome print, or by creating a texture that mixes the basic colors, pixel by pixel, according to a set percentage. When interleaved images are to be reproduced and a dithering technique is used, this technique is applied directly to the image that is to be printed, that is to the image constituted by the interleaved images. No allowance is made for the different interleaved images, and the colors are simulated for the whole image 9 formed by the interleaved images. When such an image 9 is printed and viewed through a lenticular network, as the different interleaved images have not been separated precisely, the observer will see different images successively that are not perfectly sharp, and especially see transitions between the images that are blurred in particular because of the dithering algorithm used. Such a process does not allow much flexibility either in the number of images that can be interleaved, or in the number of lines that can be allocated to each of the images.

SUMMARY OF THE INVENTION

An object of the present invention is to provide for a halftone printing process for an image comprising several interleaved images that avoids the problems of the prior art.

The invention relates to a halftone type printing process for a digital image I intended to be viewed through a lenticular network comprising a plurality of lenses. The image I comprises a number j of pixel lines and is constituted by a number n of interleaved images. One interleaved strip of each of the n images is in correspondence with one lens. The process comprises the steps of:

a) sampling n images to obtain n digital images comprising a total of j pixel lines;

b) applying a dithering algorithm to each of the n digital images obtained in the preceding step a;

c) cutting each dithered image into a number q of strips comprising an identical number of lines for each dithered image, with the cutting being such that the sum of the pixel line strips of the n images intended to correspond with the same lens equals j/q;

d) constructing the image I by interleaving the strips of n dithered images in order; and e) printing image I.

The present invention further relates to a halftone type printing process for a digital image I intended to be viewed through a lenticular network comprising a number p of lenses arranged parallel in a first direction, and a number q of lenses arranged parallel in a second direction, with the image I comprising a number j of pixel lines in a first direction and a number k of pixel lines in a second direction and including a matrix of images a*b comprising n images to be interleaved, one strip in a first interleaving direction of each of the a images and/or one strip in a second interleaving direction of each of the b images corresponding with a lens, the process comprises the steps of: sampling n images to obtain b groups of a digital images, with each group comprising in total j pixel lines in the first direction, and/or a groups of b digital images, with each group comprising in total k pixel lines in the second direction; applying a dithering algorithm to each of the n digital images obtained in the sampling step; cutting each of the n dithered images into a number p of strips in the first direction comprising an identical number of lines in the first direction for each dithered image, with the cutting being such that a sum of the pixel lines of the strips in the first direction of each group of a images intended to correspond with the same lens equals j/p; and/or cutting each of the n dithered images into a number q of strips in the second direction comprising an identical number of lines in the second direction for each dithered image, with the cutting being such that a sum of the pixel lines of the strips in the second direction of each group of b images intended to correspond with the same lens equals k/q. The process further comprises the steps of: constructing the image I by interleaving strips 1 to p of the a dithered images in order in the first direction, and/or strips 1 to q of the b dithered images in the second direction; and printing the image I.

BRIEF DESCRIPTION OF THE DRAWINGS

Other characteristics will appear on reading the following description, with reference to the drawings wherein:

FIG. 1 represents the steps of a printing process of an image constituted of interleaved images according to the prior art;

DETAILED DESCRIPTION OF THE INVENTION

A halftone type printing process for an autostereoscopic digital image according to the invention comprises constructing a digital image I from a plurality of interleaved images, that is an image I intended to be viewed through a lenticular network.

Figure 2A:
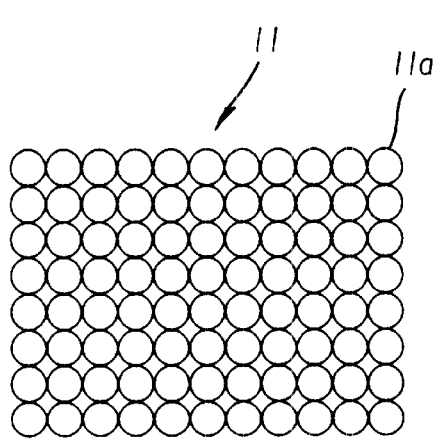
FIGS. 2A–2D represent different types of lenticular networks.
Figure 2B:
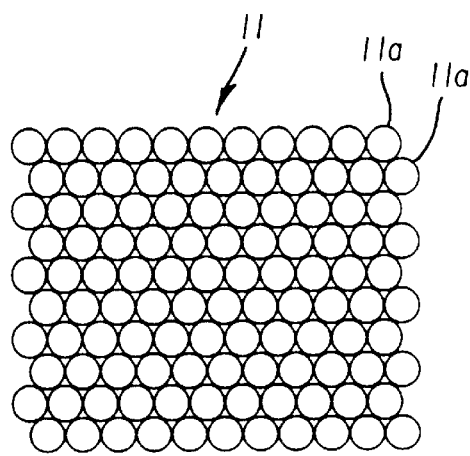
Figure 2C:
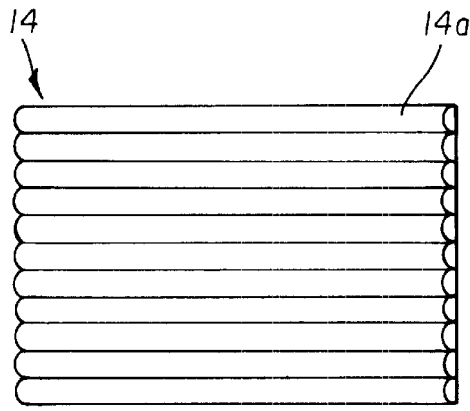
Figure 2D:
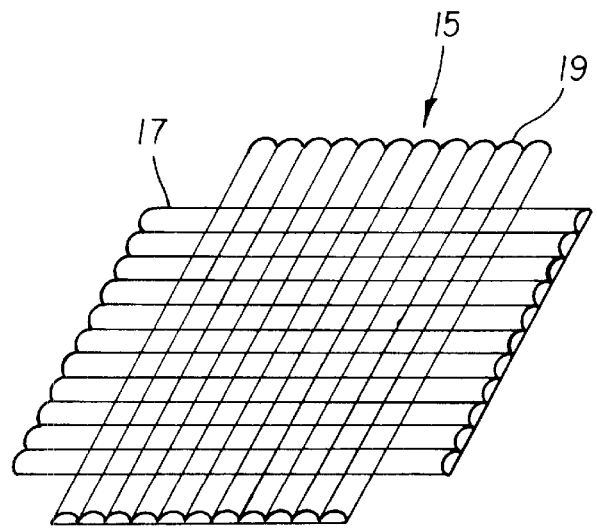

Different types of lenticular network can be used. For example, networks 11 can be used that comprise a plurality of spherical lenses 11a aligned in two directions that are, either perpendicular as in the network shown in FIG. 2A, or in two non-perpendicular directions, as shown in FIG. 2B. Equally, a network 14 can be used comprising aligned cylindrical lenses 14a, as shown in FIG. 2C. A network 15 can also be used comprising two cylindrical lens networks, lenses 17, 19 being oriented in two different directions, as shown in FIG. 2D. All types of lenticular networks enable interleaved images to be viewed in one direction. Further, the viewing of interleaved images can be considered in two directions using the lenticular networks shown in FIGS. 2A, 2B and 2D; the images then being interleaved in the directions in which the lenses are aligned. Obviously, networks can be used which comprise lenses aligned in a plurality of directions to view interleaved images in a plurality of directions.

Obviously if a stereoscopic image is to be viewed, a vertical lenticular network will be used so that each eye sees a different image in such a way that an impression of depth appears.

In the various embodiments that will be described, the dithering algorithm must allow for the type of image cutting, especially if the lenses are neither parallel nor perpendicular to the lines of the image.

There then follows consideration that the width of a strip constituted of the pixel lines of interleaved images positioned behind a lens has been carefully chosen to allow viewing of the lenticular image at a suitable distance, using the choice of an optical configuration well known to those skilled in the art.

According to a first embodiment of the invention, a lenticular network is used that allows interleaved images to be viewed in a single direction. The lenticular network comprises a plurality of aligned lenses.

Preferably, q juxtaposed cylindrical lenses are used to form the network shown in FIG. 2C that has a horizontal network.

Figure 3:
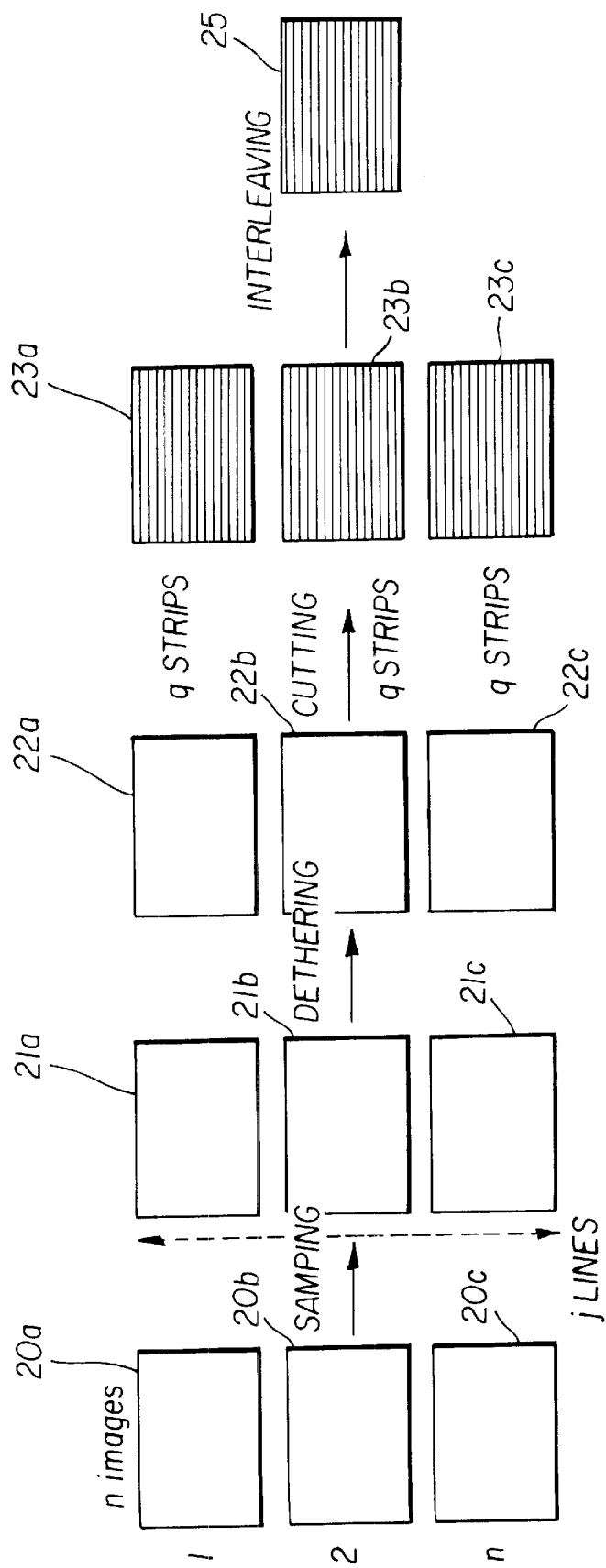
FIG. 3 represents the steps of a first embodiment of the printing process of an image comprising interleaved images according to the invention.

The image I that is to be printed to be viewed through the lenticular network is constituted of n interleaved digital images and has j pixel lines. The process according to the invention, whose steps are shown in FIG. 3, comprises sampling each of the n images 20a–20c to obtain n digital images 21a–21c comprising in total j pixel lines. The step of sampling an image comprises, for example, sequentially retrieving a plurality of lines from a digital image, and deleting the other lines to obtain an image comprising a number of lines less than the number of lines of the starting image. This step can also comprise sequentially retrieving many lines from the image, and deleting the lines not retrieved. Then each retrieved line is reproduced a set number of times on either side to obtain an image comprising a number of lines less than the starting image, with the number of lines deleted being greater than the number of lines reproduced. The sampling step can also comprise averaging the value of pixels of the same order belonging to several juxtaposed lines and only keeping the lines constituted of pixels whose value is the average obtained. Other methods can also be used such as the bilinear or bicubic methods known to those skilled in the art. Thus, n sampled digital images are obtained that have in total j pixel lines.

Obviously, a continuous tone image can also be used that is digitized before the sampling step.

Then a dithering algorithm is applied to each of the n sampled digital images. Such an algorithm allows an image to be printed by means of a halftone type printer. As this type of algorithm is commercially available, it will not be detailed in the present application.

The dithering algorithm reproduces the color of a pixel by several dots, for example four dots, yellow, magenta, cyan and black, arranged contiguously. Four dots are thus obtained to represent a pixel, two being on a line and two being on a contiguous line. In such a case, each image to which the dithering algorithm has been applied will have 2j lines of printable dots.

Each of the n dithered images 22a–22c thus obtained, is then cut into a number q of strips 23a–23c. One strip of each image must be in correspondence with one lens of the lenticular network and vice versa. Strips of the same image must comprise the same number of lines so that the observer sees a single image in a given position. Further, the size of the strips must be such that the sum of the pixel lines of each of the n images in correspondence with a lens equals j/q, which is not always a whole number. However, as a pixel line can comprise many lines of printable dots, a pixel line can be cut up. For example, if the dithering algorithm reproduces a pixel by four dots of printable color, a pixel line is represented by two lines of dots of printable color. The same pixel line can be cut up, one line of dots of printable color forming part of one strip, and the other line of dots of printable color forming part of another strip. Thus, there is more flexibility for cutting into strips because the dithering algorithm is applied to the images before cutting into strips.

The image I can be constructed from n dithered images cut into strips. The n dithered images are arranged in the desired order. Strips of the same order of the n images 25 are interleaved by first making composite strips comprising, side by side and in the same order, strips of the same order of each of the n dithered images, put into the desired order, and then the composite strips are juxtaposed in the number order of the strips. The image I is then such that one strip of the same order of each of the n images corresponds with one lens.

The image I thus obtained is then printed using a halftone type printer.

According to a second embodiment of the process of the invention, a lenticular network is used that allows interleaved images to be viewed in two directions.

For example, a network is chosen which comprises two superimposed networks each comprising several cylindrical lenses, the networks being oriented in two different directions, for example perpendicular, as shown in FIG. 2D. The network has p lenses arranged parallel in a first direction, and q lenses arranged parallel in a second direction.

Figure 4:
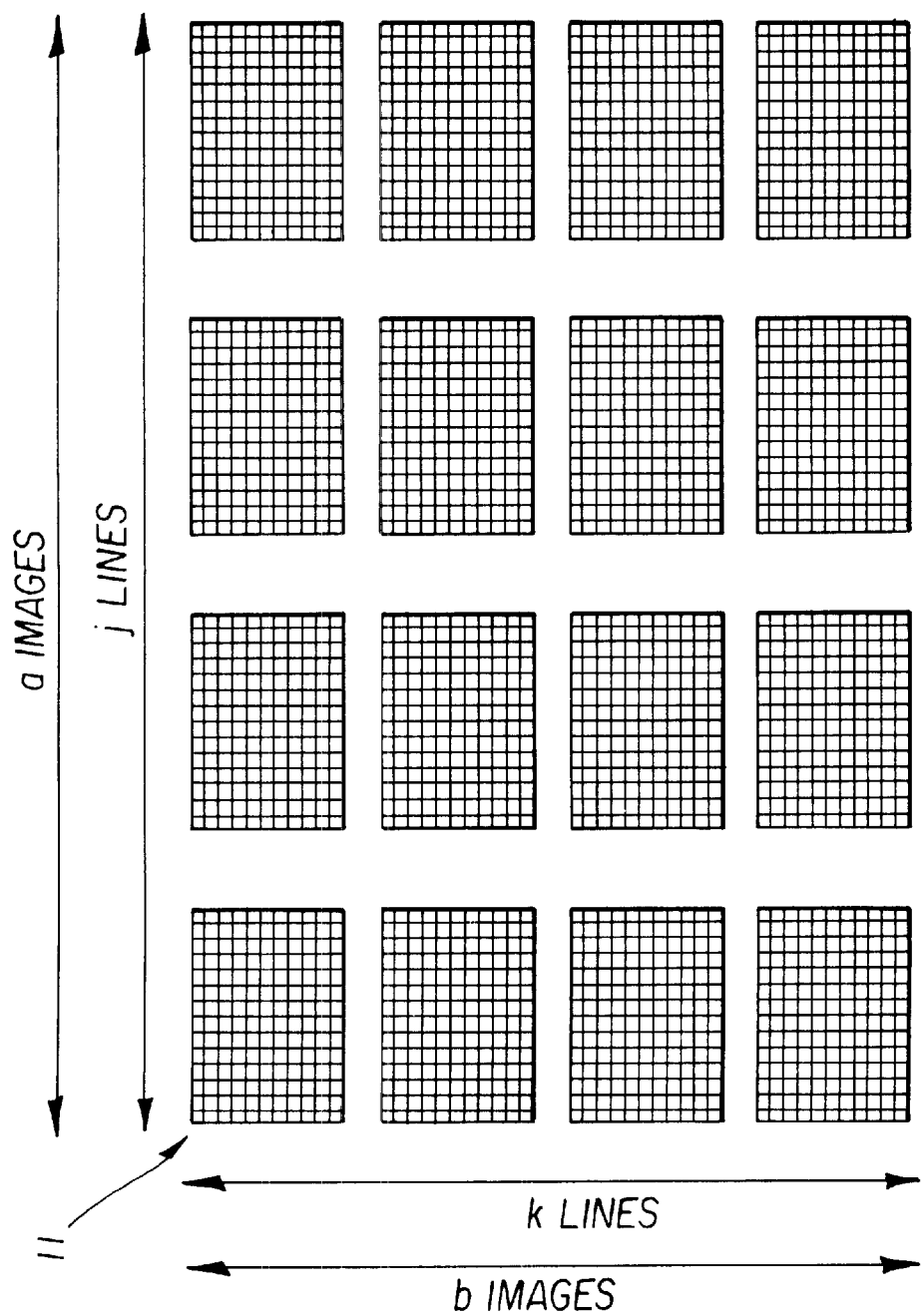
FIG. 4 represents a matrix of images used in a second embodiment of the printing process.

According to the second embodiment of the invention, the image I that is to be printed to be viewed through lenticular network 11 is constituted by a matrix of images a*b, shown in FIG. 4. The matrix of images a*b has in total n digital images to be interleaved in two directions.

The step of sampling the initial n digital images must enable b groups of a images to be obtained, each group comprising in total j pixel lines in the first direction, and a groups of b images, each group comprising in total k pixel lines in the second direction. The same sampling techniques as those used in the first embodiment can be used. However, the sampling is done in either direction or in both directions.

A dithering algorithm is then applied to the sampled images. Each dithered image is then cut up into strips, as in the first embodiment, but in both directions of the alignment of the network lenses. The n images are cut up into p strips in the first direction, and q strips in the second direction. The size of the strips is such that the sum of the pixel lines of the strips, in the first direction, of each of the a images of the b groups intended to be in correspondence with the same lens, equals j/p, and the sum of the lines of the strips, in the second direction, of the b images of the a groups intended to be in correspondence with the same lens, equals k/q.

The image I is then constructed by interleaving in order the 1 to p strips of the a dithered images in the first direction, and the 1 to q strips of the b dithered images in the second direction.

According to one alternative of the last embodiment, the n images are cut into p strips in the first direction, and strips 1 to p of the a images are interleaved for each of the b groups of the a images. Thus, b images are obtained; each image is then cut up into q strips in the second direction. Then strips 1 to q of the b images are interleaved. Obviously the initial cutting can be of the n images into q strips in the second direction and interleaving the 1 to q strips of the b images for each of the a groups of b images, and then cutting each of the a images obtained into p strips. Obviously other interleaving sequences can be used to form the image I. The image I thus obtained is then printed by a halftone type printer.

The invention has been described in detail with particular reference to certain preferred embodiments thereof, but it will be understood that variations and modifications can be effected within the spirit and scope of the invention.

What is claimed is:

1. A halftone type printing process for a digital image I intended to be viewed through a lenticular network comprising a plurality of lenses, the image I comprising a number j of pixel lines and comprises a number n of interleaved images, one interleaved strip of each of the n images being in correspondence with one lens, the process comprising the steps of:
    sampling n images to obtain n digital images comprising a total of j pixel lines;
    applying a dithering algorithm to each of the n digital images obtained in said sampling step to obtain dithered images;
    cutting each dithered image into a number q of strips comprising an identical number of lines for each dithered image, the cutting being such that a sum of pixel line strips of the n images intended to correspond with the same lens is equal to j/q;
    constructing of the image I by interleaving the strips of n dithered images in order; and
    printing image I.

2. A printing process according to claim 1, wherein said lenticular network comprises cylindrical lenses.

3. A printing process according to claim 1, wherein the sampling is obtained by sequentially retrieving one line in one of the directions from each of the n images.

4. A printing process according to claim 1, wherein the sampling is obtained by sequentially retrieving a plurality of lines in one of the directions from each of the n images, and reproducing them a plurality of times.

5. A printing process according to claim 1, wherein the sampling is obtained by retrieval by averaging a value of pixels of the same order of juxtaposed lines.

6. A halftone type printing process for a digital image I intended to be viewed through a lenticular network comprising a number p of lenses arranged parallel in a first direction, and a number q of lenses arranged parallel in a second direction, the image I comprising a number j of pixel lines in a first direction and a number k of pixel lines in a second direction and including a matrix of images a*b comprising n images to be interleaved, one strip in a first interleaving direction of each of the a images and/or one strip in a second interleaving direction of each of the b images corresponding with a lens, the process comprising the steps of:
    sampling n images to obtain b groups of a digital images, each group comprising in total j pixel lines in the first direction, and/or a groups of b digital images, each group comprising in total k pixel lines in the second direction;
    applying a dithering algorithm to each of the n digital images obtained in the sampling step;
    cutting each of the n dithered images into a number p of strips in the first direction comprising an identical number of lines in the first direction for each dithered image, the cutting being such that a sum of the pixel lines of the strips in the first direction of each group of a images intended to correspond with the same lens equals j/p;
    cutting each of the n dithered images into a number q of strips in the second direction comprising an identical number of lines in the second direction for each dithered image, the cutting being such that a sum of the pixel lines of the strips in the second direction of each group of b images intended to correspond with the same lens equals k/q;
    constructing the image I by interleaving strips 1 to p of the a dithered images in order in the first direction, and/or strips 1 to q of the b dithered images in the second direction; and
    printing the image I.

7. A printing process according to claim 6, wherein the sampling is obtained by sequentially retrieving one line in one of the directions from each of the n images.

8. A printing process according to claim 6, wherein the sampling is obtained by sequentially retrieving a plurality of lines in one of the directions from each of the n images, and reproducing them a plurality of times.

9. A printing process according to claim 6, wherein the sampling is obtained by retrieval by averaging a value of pixels of the same order of juxtaposed lines.

10. A halftone type printing process for a digital image I intended to be viewed through a lenticular network comprising a number p of lenses arranged parallel in a first direction, and a number q of lenses arranged parallel in a second direction; the image I comprising a number j of pixel lines in a first direction and a number k of pixel lines in a second direction and including a matrix of images a*b comprising n images to be interleaved, one strip in a first interleaving direction of each of the a images and/or one strip in a second interleaving direction of each of the b images corresponding with a lens, the process comprising the steps of:
    sampling n images to obtain b groups of digital images, each group comprising in total j pixel lines in the first direction, and/or a group of b digital images, each group comprising in total k pixel lines in the second direction;
    applying a dithering algorithm to each of the n digital images obtained in said sampling step;
    cutting each of the n dithered images into a number p of strips in the first direction comprising an identical number of lines in the first direction for each dithered image, the cutting being such that a sum of the pixel lines of the strips in the first direction of each group of images intended to correspond with the same lens equals j/p;

constructing the image I by interleaving strips 1 to p of the dithered images in order in the first direction; and printing the image I.

11. A halftone type printing process for a digital image I intended to be viewed through a lenticular network comprising a number p of lenses arranged parallel in a first direction, and a number q of lenses arranged parallel in a second direction; the image I comprising a number j of pixel lines in a first direction and a number k of pixel lines in a second direction and including a matrix of images a*b comprising n images to be interleaved, one strip in a first interleaving direction of each of the a images and/or one strip in a second interleaving direction of each of the b images corresponding with a lens, the process comprising the steps of:

sampling n images to obtain b groups of digital images, each group comprising in total j pixel lines in the first direction, and/or a group of b digital images, each group comprising in total k pixel lines in the second direction;

applying a dithering algorithm to each of the n digital images obtained in said sampling step;

cutting each of the n dithered images into a number q of strips in the second direction comprising an identical number of lines in the second direction for each dithered image, the cutting being such that a sum of the pixel lines of the strips in the second direction of each group of b images intended to correspond with the same lens equals k/q;

constructing the image I by interleaving strips 1 to q of the b dithered images in the second direction; and printing the image I.

* * * * *